Feb. 16, 1954 G. L. PEARSON 2,669,692
METHOD FOR DETERMINING ELECTRICAL CHARACTERISTICS
OF SEMICONDUCTIVE BODIES
Filed Aug. 10, 1951

INVENTOR
G. L. PEARSON
BY
ATTORNEY

Patented Feb. 16, 1954

2,669,692

UNITED STATES PATENT OFFICE 2,669,692

METHOD FOR DETERMINING ELECTRICAL CHARACTERISTICS OF SEMICONDUCTIVE BODIES

Gerald L. Pearson, Millington, N. J., assignor to Bell Telephone Laboratories, Incorporated, New York, N. Y., a corporation of New York Application August 10, 1951, Serial No. 241,217

9 Claims. (Cl. 324—158)

1

This invention relates to methods for determining the electrical characteristics of semiconductive bodies and more particularly to methods of locating junctions and determining resistivity gradients in such bodies.

In a number of types of signal translating devices, of which the devices disclosed in Patent 2,402,662, granted June 25, 1946, to R. S. Ohl, Patent 2,502,488 granted April 4, 1950 to W. Shockley and application Serial No. 35,423 filed June 26, 1948 of W. Shockley, now Patent 2,569,-347 granted September 25, 1951 are illustrative, a principal element is a body of semiconductive material, such as germanium or silicon, having therein two or more contiguous zones of opposite conductivity type, that is N-type or P-type. Each pair of adjacent zones defines what is termed a PN junction. The several zones may be of substantially uniform conductivity or there may be gradations in resistivity toward or away from the junction or junctions. Methods of producing bodies of this class are disclosed in the patent to Ohl above identified and in the applications of J. H. Scaff and H. C. Theuerer, Serial No. 638,351, filed December 29, 1945, now Patent 2,602,211, granted July 8, 1952 and G. K. Teal, Serial No. 168,184, filed June 15, 1950.

In the construction of such devices, it is necessary to precisely locate the PN junction or junctions. This is particularly important in the case of devices including bodies of PN, NPN or PNP configuration and an electrical connection to one or more of the zones and in a prescribed relation to the junction. Heretofore, the location has been effected by electrical probe measurements or light spot scanning; both these methods entail delicate operations and are time consuming, and thus are not economical. Also, they involve the practical difficulty of marking the position of the junction once it has been located.

Further, the suitability of a semiconductive body for use in translating devices is dependent in many cases upon the resistivity gradients extant in the body or at a particular region thereof, for example adjacent a PN junction therein. These gradients may be determined in manners like those utilized to locate junctions and are similarly unsatisfactory for reasons noted hereinabove.

One general object of this invention is to facilitate the determination of the electrical characteristics of semiconductive bodies. More specifically, objects of this invention are to expedite the location of PN junctions in semiconduc-

2 tor bodies, to enable the ready marking thereof, and to simplify the ascertainment of resistivity gradients in such bodies.

In accordance with one feature of this invention, PN junctions and resistivity gradients are located and determined by producing on one surface of the semiconductive body a permanent visible pattern of particles indicative of the junction or gradient. More particularly, in accordance with this invention, one surface of the semiconductor is provided with a film of a suspension of dielectric particles in an insulating liquid, and an electrical field is established in the semiconductor of character to polarize the particles whereby they are arranged in concentrations dependent upon and indicative of the conductivity type and resistivity gradient contours of the surface. When the liquid evaporates, the particles adhere to the surface and provide a pattern showing the position of the junction and the resistivity gradients. The particles are inert and do not affect the performance of devices in which the semiconductive body is incorporated.

The invention and the features thereof will be understood more clearly and fully from the following detailed description with reference to the accompanying drawing, in which.

Figure 1:
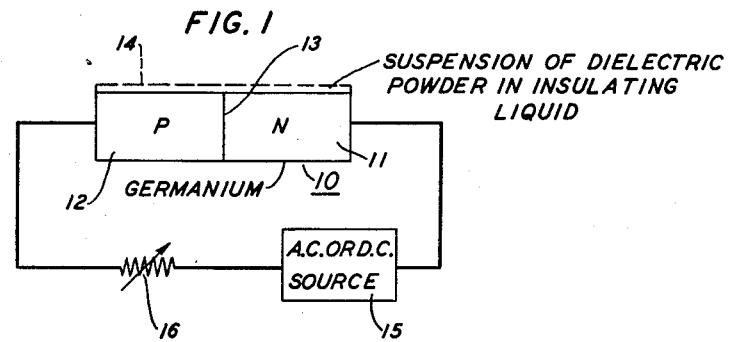
Fig. 1 is a diagram illustrating one manner in which the invention may be practiced.

Referring now to the drawing there is illustrated in Fig. 1 a semiconductive body 10, for example a wafer of germanium, having therein two contiguous zones 11 and 12 of N and P conductivity type respectively, as indicated by the letters thereon, the two zones meeting at a PN junction 13. Upon one surface of the body or wafer 10 is a film 14 of constitution and characteristics which will be described presently. A source of potential 15 in series with a current controlling resistor 16 is connected across the ends of the wafer 10 to provide a strong reverse bias across the junction 13.

The film 14 is a suspension of fine particles of dielectric material in a liquid having high electrical insulation resistance, low viscosity and a density sufficient to support the particles. A particularly advantageous suspension is one of finely powdered barium titanate in xylene in the proportion of about 3 grams barium titanate to 100 cubic centimeters of xylene. The film may be produced by applying a drop or drops of the suspension to the surface of the germanium wafer 10 and then spreading the suspension over this surface.

By virtue of the electric field established in the wafer 10 by the source 15 the dielectric particles are polarized and are distributed over the surface in accordance with the field contours at this surface. The field is greatest immediately adjacent the junction 13 and because of the reverse bias a greater concentration of the particles appears on the surface of the P zone 12 than upon the surface of the N zone 11. After the polarization of the particles the suspending liquid therefor may be evaporated leaving upon the surface of the body 10 a pattern defined by the particles which precisely locates the junction 13 and indicates resistivity gradient contours on the surface.

In an electric field, the barium titanate particles become polarized with a positive charge on one side of the particle and a negative charge on the other. In a uniform electric field, substantially no force is exerted on the particles, but in a varying field there is a force proportional to $$\frac{d^2V}{dx^2}$$

where V is voltage and $x$ is distance. At a PN junction the field gradient, $$\frac{dV}{dx}$$

is greatest and, hence, the particles are attracted thereto.

Figure 2:
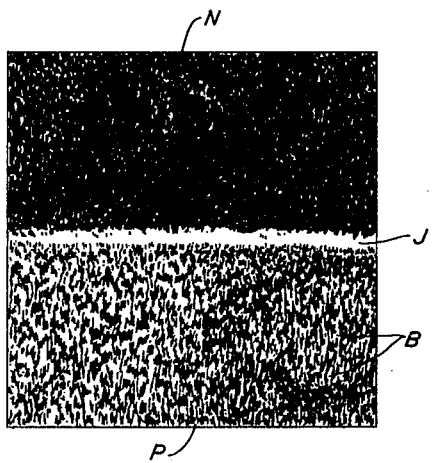
Figs. 2 and 3 are reproductions of microphotographs of typical patterns produced on germanium bodies by the methods of this invention.
Figure 3:
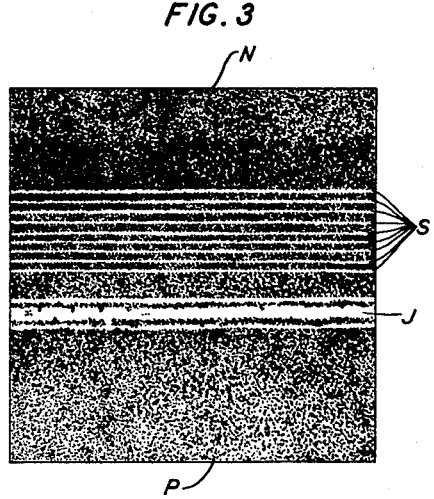

Figs. 2 and 3, which are reproductions of microphotographs, illustrate typical patterns produced in accordance with the methods of this invention. As is evident in Fig. 2 and as indicated at J, the concentration of particles is greatest on the P zone surface and immediately adjacent junction 13. Also as indicated by the area B, in which the concentration of particles decreases away from the junction, a definite resistivity gradient obtained along the surface of the sample. Thus, the pattern precisely locates the PN junction, indicates the magnitude and direction of the resistivity gradients in the semiconductive material and provides a permanent visible record thereof.

As evidenced by the pattern in Fig. 3, the junction is located by the greatest concentration of particles at the region J. The striations indicated at S are due to resistivity variations in the semiconductor sample.

It will be appreciated that not only is the method useful for the location of junctions in semiconductor bodies, but it may be employed also to determine the direction and nature of resistivity variations in semiconductor bodies whether or not the bodies include one or more PN junctions.

Although in the specific embodiment above described the suspension was one of barium titanate in xylene, other materials having a high dielectric constant and other liquids having the characteristics above set forth may be utilized. Illustrative of the dielectric materials are diamond dust, say of 1 micron size, and powders of Alundum and titanium dioxide. Other liquids which may be employed are carbon tetrachloride, bromoform and trichloro ethylene.

The voltage applied by the source 15 to the body 10 advantageously should be relatively high but below the Zener voltage. For example in a typical case, the reverse bias across the junction 13 may be of the order of 50 volts. The voltage applied may be either direct current or alternating current. In the latter case it may be for example of 60 cycles and of amplitude of 50 volts. It will be understood that in the case of an alternating-current potential, the dispersion and arrangement of the dielectric particles is effected only by the half cycles of the applied voltage which bias the junction 13 in the reverse direction.

Figure 4:
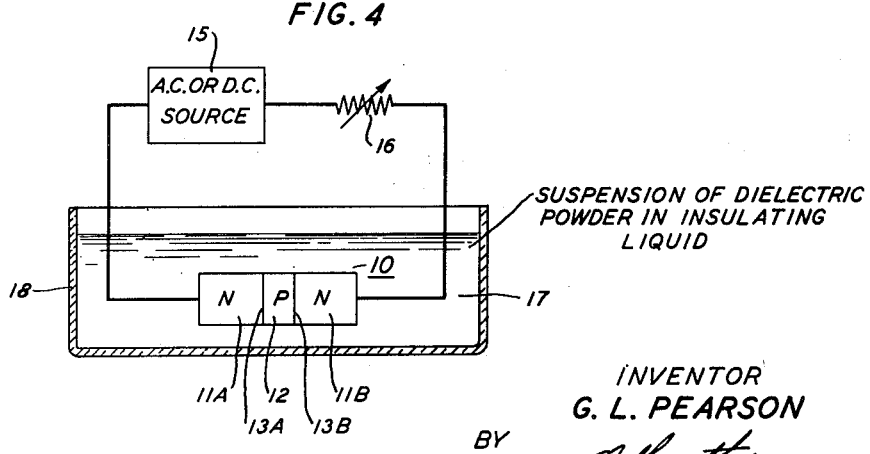
Fig. 4 illustrates another way in which the invention may be practiced.

In the embodiment of the invention illustrated in Fig. 4, the semiconductive wafer 10, which is shown as including a P-type zone between two N-type zones 11A and 11B and forming junctions 13A and 13B therewith, is immersed in a suspension 17 in a vessel 18. The suspension may be the same as those noted hereinabove in the discussion of Fig. 1. Polarization of the dielectric particles in the suspension is effected in the same manner as in the embodiment illustrated in Fig. 1 and described hereinabove. The source 15 advantageously is an alternating current one for the case of a semiconductor of the configuration illustrated in Fig. 4. After the polarization of the particles the wafer 10 is removed from the suspension and patterns akin to those discussed heretofore locate the junctions 13A and 13B and indicate resistivity gradients in the semiconductor.

Although specific embodiments of the invention have been shown and described, it will be understood that they are but illustrative and that various modifications may be made therein without departing from the scope and spirit of this invention.

What is claimed is:

1. The method of determining the variation of electrical characteristics of a body of semiconductive material in one direction along the body which comprises applying to the body a suspension of dielectric particles in an insulating liquid, and applying a potential between points on the body spaced in said direction.

2. The method of determining electrical characteristics of a body of semiconductive material which comprises forming on one surface of said body a film of a suspension of dielectric particles in an insulating liquid, establishing an electric field in said body and in the direction along said surface, and drying the body.

3. The method of determining electrical characteristics of a body of semi-conductive material which comprises immersing the body in a suspension of dielectric particles in an insulating liquid, impressing a potential between spaced points on the body to establish a field along one surface of said body, and withdrawing the body from the suspension.

4. The method of locating a PN junction in a body of semiconductive material which comprises applying to the body a suspension of dielectric particles in an insulating liquid, and establishing an electric field in said body and in the reverse direction across the junction.

5. The method of locating a PN junction in a body of semiconductive material which comprises applying to the body a suspension of dielectric particles in an insulating liquid, and applying a direct-current potential in the reverse direction across the junction.

6. The method of locating a PN junction in a body of semiconductive material which comprises applying to the body a suspension of dielectric particles in an insulating liquid, and applying an alternating-current potential between points of the body on opposite sides of the junction.

7. The method of determining electrical characteristics of a body of semiconductive material which comprises producing on the body a coating of a suspension of barium titanate particles in xylene, and applying a potential between regions of said body spaced along said coating.

8. The method of locating a PN junction in a body of germanium which comprises immersing the body in a suspension of ceramic particles in a liquid having high insulation resistance, establishing an electric field in said body and in the reverse direction across the junction, and withdrawing the body from the suspension.

9. The method of locating a PN junction in a body of germanium which comprises immersing the body in a suspension of barium titanate particles in xylene, applying an alternating-current potential between regions of the body on opposite sides of the junction, and withdrawing the body from the suspension.

GERALD L. PEARSON.

References Cited in the file of this patent
UNITED STATES PATENTS

| Number | Name | Date |
|---|---|---|
| 2,499,467 | De Forest | Mar. 7, 1950 |